United States Patent [19]

Schrage et al.

[11] Patent Number: 4,872,785
[45] Date of Patent: Oct. 10, 1989

[54] SHUT-OFF MEANS FOR AIR-ACTUATED PLANTER

[76] Inventors: Timothy L. Schrage; Jay T. Schrage; Lester Schrage, all of 420 Locust St., P.O. Box 565, Allison, Iowa 50602

[21] Appl. No.: 146,860

[22] Filed: Jan. 22, 1988

[51] Int. Cl.⁴ ............................................. B65G 53/40
[52] U.S. Cl. ..................................... 406/155; 406/41; 406/181; 406/192
[58] Field of Search ...................... 406/38, 39, 41, 1, 2, 406/154, 155, 181–183, 192; 111/34, 73, 69, 80; 251/129.02, 129.2, 305, 313, 337

[56] References Cited

U.S. PATENT DOCUMENTS

| | | | |
|---|---|---|---|
| 674,641 | 5/1901 | Whittemore | 406/183 X |
| 1,302,428 | 4/1919 | Pereda | 406/155 X |
| 1,444,648 | 2/1923 | Willis et al. | 406/183 X |
| 1,889,299 | 11/1932 | Stein | 406/155 |
| 2,770,912 | 11/1956 | Deem | 406/39 X |
| 2,872,248 | 2/1959 | Martin | 406/41 X |
| 3,189,230 | 6/1965 | Gillespie | 406/181 X |
| 3,515,315 | 6/1970 | Kidd | 406/182 |
| 4,562,968 | 1/1986 | Widmer et al. | 406/181 X |

Primary Examiner—Joseph F. Peters, Jr.
Assistant Examiner—James M. Kannofsky
Attorney, Agent, or Firm—Zarley, McKee, Thomte, Voorhees & Sease

[57] ABSTRACT

A shut-off means for an air-actuated planter is disclosed, which includes a butterfly valve located within the air manifold of the planter unit, which is connected to a rotational means further connected to a solenoid. A power source is connected to the solenoid which, with the activation of a switch, causes current to flow to the solenoid, rotating the rotational means, and causing the butterfly valve to move within the air manifold. In this manner, air within the air manifold may be blocked at any point where the air valve is located, shutting off the air source to one or more planter units.

9 Claims, 2 Drawing Sheets

U.S. Patent    Oct. 10, 1989    Sheet 1 of 2    4,872,785
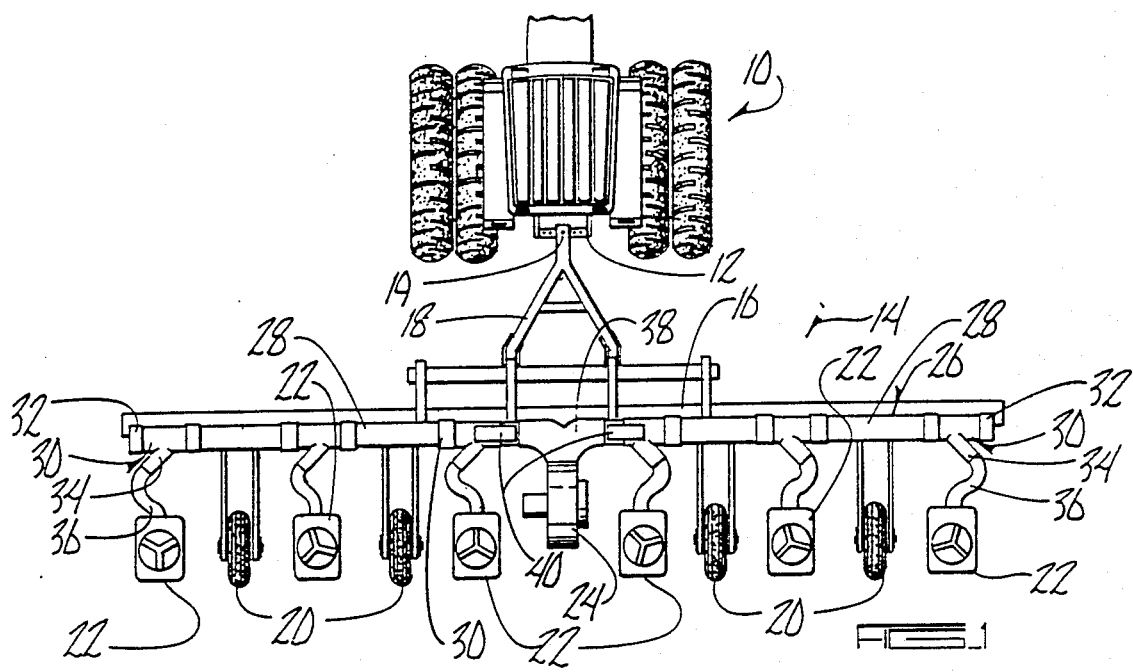
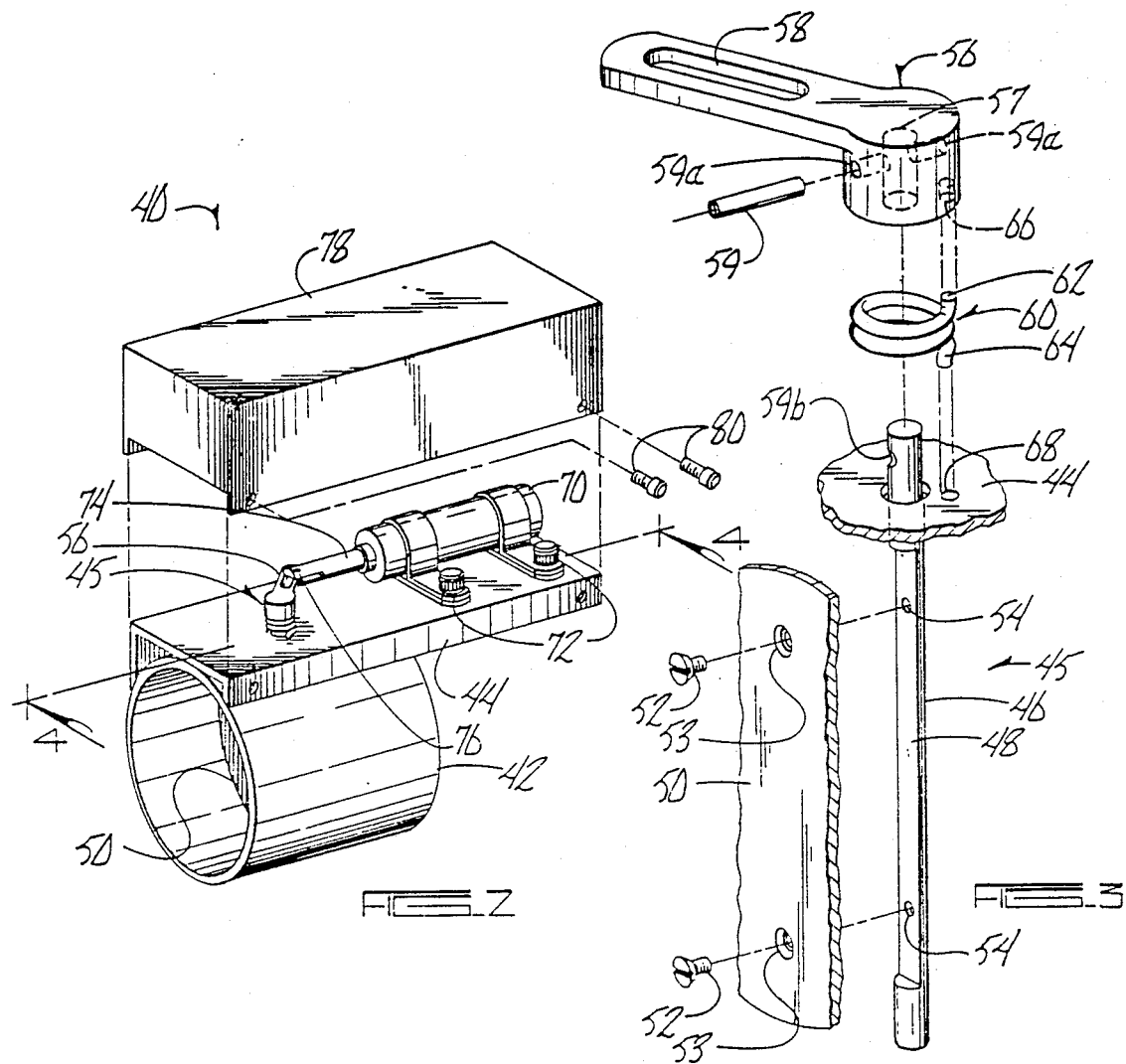

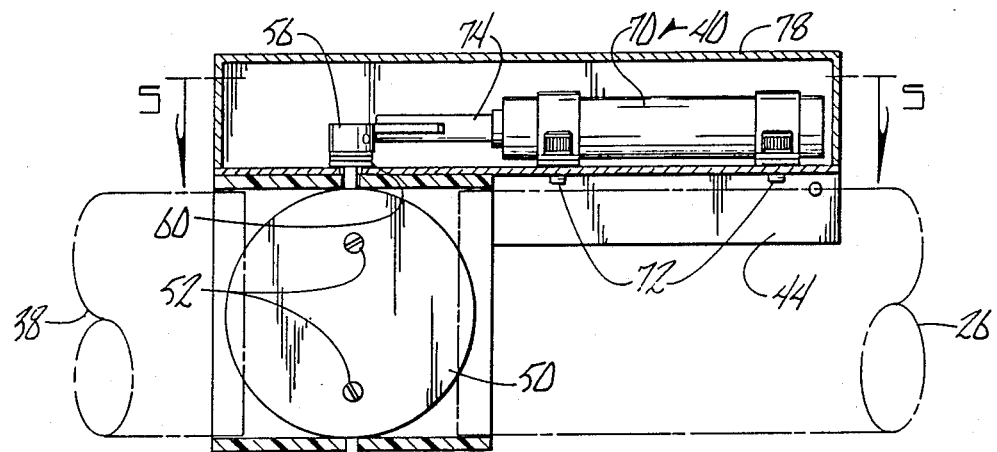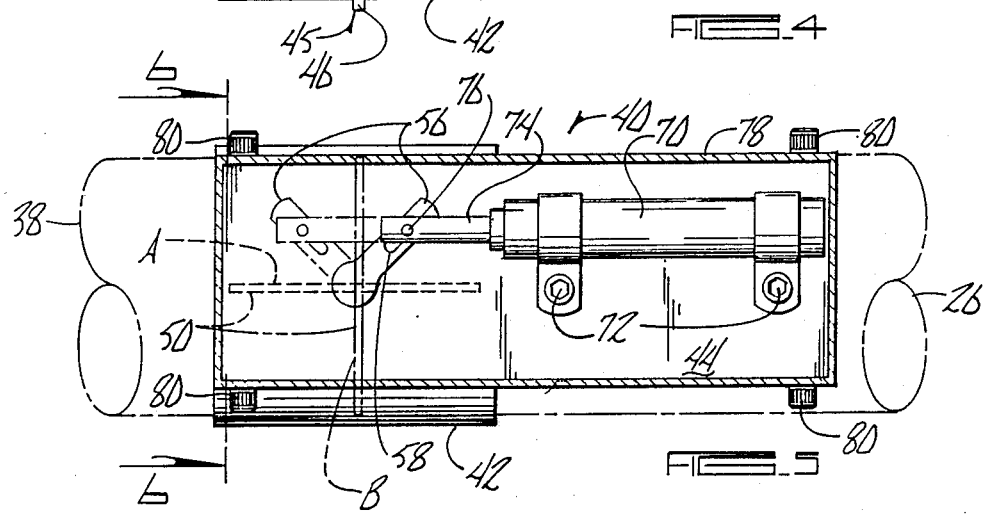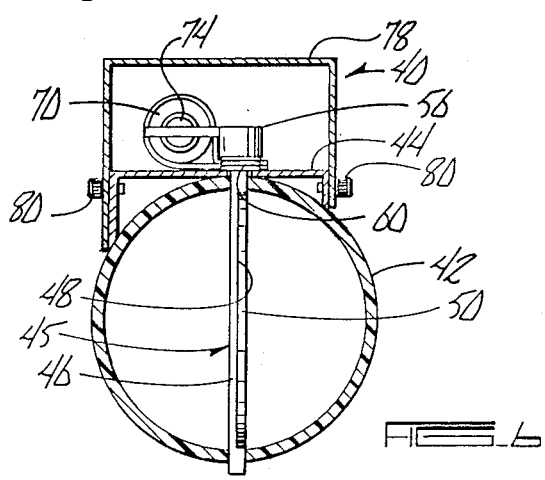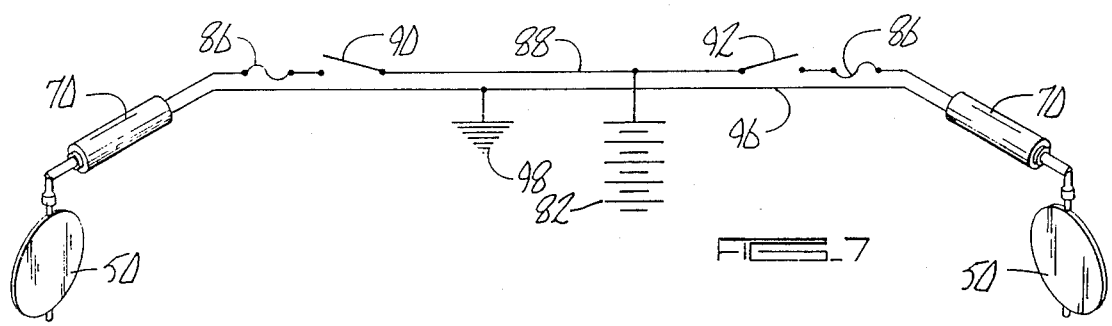

SHUT-OFF MEANS FOR AIR-ACTUATED PLANTER

BACKGROUND OF THE INVENTION

Air-actuated planters are frequently used by farmers, and are useful in insuring that one seed at a time is dropped from the planters in the furrow. This typically involves multiple row planter units connected to a planter, which has an air source to effect the deposit of the plant seeds from the planter unit individually.

When operating the planter while crossing waterways, or in fields of varying shapes, it is advantageous to be able to shut off the planter, or certain of the rows being planted, to avoid wasting seed. However, it is inconvenient for the operator to leave the tractor cab, and manually turn on or off the air flow. This invention relates to an improved method of shutting off the planter unit while the operator remains in the tractor cab. Such a device saves time and avoids wasted seed.

Accordingly, it is an object of this invention to provide for an improved shut-off means for an air-actuated planter.

Another object of the invention is to provide for a shut-off means which can be operated from within the tractor cab.

A still further object is to provide for a shut-off means which can cut off air to one or more planter units.

A further object is to provide for a shut-off device which may be relatively easily installed in existing planter units.

SUMMARY OF THE INVENTION

The invention relates to an improved shut-off device for air actuated planters which employs an air valve means, which in the preferred embodiment of the invention is a butterfly valve. The butterfly valve is actuated from a switch within the tractor cab. The switch, when in the operating position, connects a power source, ordinarily a battery, to a solenoid. The solenoid causes the butterfly valve to rotate into a position which restricts the air in the air manifold pipe leading to the planting units. When in the non-operating position, a resisting device, which may be a spring coil, urges the butterfly valve into a position of least resistance to air passing through the manifold. This may be located in the solenoid or provided for separately. In an embodiment of the invention, the valves may be placed so as to restrict air intake selectively at one or more of the planting units.

DETAILED DESCRIPTION OF THE DRAWINGS

FIG. 1 is a plan view of the shut-off means employed in an air-actuated planter.

FIG. 2 is an exploded perspective view at an enlarged scale of the solenoid and its attachment within the manifold.

FIG. 3 is an exploded perspective view at an enlarged scale of the crank arm and shaft connecting the valve to the solenoid.

FIG. 4 is a partial sectional side view of the solenoid and valve in operation, taken along lines 4—4 of FIG. 2.

FIG. 5 is a partial top sectional view of the solenoid and valve taken along line 5—5 of FIG. 4.

FIG. 6 is a sectional view taken along line 6—6 of FIG. 5.

FIG. 7 is a schematic depiction of the switching mechanism of the shut-off means.

DETAILED DESCRIPTION OF THE INVENTION

In FIG. 1 is shown a tractor 10 having a drawbar 12 in front to which is connected a planter 14. Planter 14 includes a frame 16 having a tongue attached to the drawbar 12 by a drawbar pin 19. A plurality of wheel supports 20 are located on the frame 16. Alternating with the wheel supports 20 are row planter units 22, with six shown in the preferred embodiment. An air fan means 24 is centrally located on the frame 16 and in communication with an elongated cylindrical air manifold 26.

The manifold 26 consists of straight pipes 28 connected to and alternating with Y-connectors 30. Y-connectors 30 consist of passage of air to the row planter units 22. Located on either end of the manifold 26 are caps 32 which contain the air within the manifold 26 and Y-connectors 30. Y-connectors 30 consist of arms 34 matingly attached with flexible tubes 36. A Y-shaped manifold connector 38 provides the communication of the air fan means 24 with the manifold 26.

Placed on either side of the air fan means 24, within the elongated cylindrical air manifold 26 are air valves 40. The air valve 40 is shown in greater detail in FIGS. 2 and 3. A connector flange 42 is shown which provides attachment with the Y-connector 30. Attached to the connector flange 42 is a bracket 44. Within the connector flange 42 is located a valve mechanism 45 (FIG. 3). Valve mechanism 45 includes a shaft 46 which has a flattened portion 48 to which is attached the circular butterfly valve element 50. This element 50 is of a circular size and shape to fit within the interior cross-section of the air manifold 26 in a manner to block off the passage of air, when in a closed position. When in an open position, the butterfly valve element 50 allows air to pass freely through the manifold 26. The valve mechanism 45 provides a means for of rotating the circular butterfly valve element 50 from a closed to an open position.

The butterfly valve element 50 is attached to the shaft 46 with screws 52. The two screws 52 are shown passing through two apertures 53 in the butterfly valve 50 and are threadingly connected with apertures 54 in the shaft 46. Shaft 46 passes through a suitable aperture in the bracket 44 and is attached to a crank arm 56. The shaft 46 is snugly fit into a bore 57 which is of a shape to receive the upper end of the shaft 46. In this embodiment, the outer end of the crank arm 56 in an elongated slot 58. A roll pin 59 fits into aperture 59A located on the side of crank arm 56. After passing through aperture 59A, it further engages aperture 59B, which is located in the upper end of shaft 46, to provide rigid engagement between crank arm 56 and shaft 46. A coil spring 60 may be located between shaft 46 and crank arm 56, having an upper end 62 and a lower end 64. Aperture 66, located in the bottom of crank arm 56, is adapted to receive upper end 62 of the coil spring 60. Another aperture 68 in bracket 44 receives the lower end 64 of coil spring 60. The coil spring provides resistance, so that in the normal position, it causes the shaft 46 to maintain the butterfly valve 50 in an open position. Spring 60 normally holds valve 50 in an open position as will be discussed hereinafter.

In FIG. 2, the solenoid 70 is attached to the bracket 44 by bolts 72. A plunger 74 is shown at one end of solenoid 70 which is attached to the elongated slot 58 of crank arm 56 by a pin 76. Therefore, it can be seen that when the solenoid is provided with power, plunger 74 extends, and by means of its engagement with slot 58 of crank arm 56, causes the crank arm 56 to rotate compressing the coil spring 60, and rotating shaft 46, and attached butterfly valve 50. When the power source to solenoid 70 is turned off, plunger 74 retracts, crank arm 56 returns to its normal position, with coil spring 60 aiding shaft 46 in returning butterfly valve 50 to an open position. A cover 78 protects solenoid 70, and is attached to bracket 44 by bolts 80. (If the solenoid 70 were pivotally mounted on member 44, the elongated slot 58 could be eliminated and replaced by a pivotal bearing. Also, the conventional spring in solenoid 70, if strong enough, could make spring 60 unnecessary.)

Further detail of air valve 40 is shown in FIGS. 4, 5, and 6. FIG. 4 is a partial sectional view taken along line 4—4. Butterfly valve 50 is seen in an open position within air manifold 26. Bolts 52 can be seen attaching the butterfly valve 50 to shaft 46, which extends up through bracket 44, spring 60, and into crank arm 56. Placement of the solenoid 70 is shown, including the cover 78.

FIG. 5 is another sectional view, which is a topview taken along lines 5—5 of FIG. 4. The solid lines show plunger 74 of solenoid 70 attached to the crank arm 56 by pin 76. In this position, the butterfly valve 50 is seen in its open position, represented at A. When power is provided to solenoid 70, movement of the plunger 74 can be seen, which also causes crank arm 56 to rotate so that butterfly valve 50 moves to a closed position, shown at B. Of course, there can be a number of variations upon this positioning which would still fall within the scope of the invention.

FIG. 6 shows the air valve 40 head on, in a cross-sectional view taken along line 6—6 of FIG. 5.

FIG. 7 is a schematic depiction of the energy source to the solenoids 70. A battery 82 is one option, in this preferred embodiment, of providing the power source. Fuses 86 are shown in electric line 88, providing an optional safety mechanism. Electric line 88 is in communication with solenoid 70, and battery 82. Imposed in line 88 are switches 90, and 92. These switches are connected in parallel with battery 82 so that each may work independently of each other. An electric line 96 leads from solenoids 70 to ground 98. In this manner, it can be seen that when one switch, switch 90 for example, is engaged, battery 82 provides power source to a solenoid 70, causing the valve mechanism 45 to close the butterfly valve 50. Current travels back to ground 98 through wire 96. In this manner, one side of the air manifold 26 may be blocked from the passage of air, while the other side of the air manifold 26 remains open. Both sides may be closed by closing both switches 90 and 92. It should be apparent that any number of air valves 40 may be located at any point along the air manifold 26 with any number of switches 90 to block off air to any number of row planter units 22. Valves 40 could be imposed in conduits 36 to provide control of individual planter units.

A number of variation can occur in the preferred embodiment and still remain within the scope of the invention.

Thus, it is seen that this invention achieves at least all of its stated objectives.

What is claimed is:

1. A seed planter, comprising:
   a frame device including an elongated frame member;
   means for securing said elongated frame member to the rearward end of a tractor;
   a plurality of air-actuated row planter units secured to said elongated frame member in spaced relation;
   an elongated air conduit secured to and extending in parallel relationship to said elongated frame member;
   an air fan means on said frame device and in communication at a juncture with said air conduit for moving air through said air conduit;
   means connecting said row planter units to said air conduit so that air moving in said air conduit can operate said row planter units;
   a plurality of air valve means in said air conduit and adapted to open and close different segments of said air conduit to the flow of air;
   and control means operatively connected to said air valve means for independent operation of said air valve means whereby some of said row planter units can be selectively closed to air flow while other of said row planter units can be open to air flow to permit seed planting by some of said planter units while rendering inoperative other of said seed planter units.

2. The planter of claim 1 wherein said air valve means includes a butterfly valve in said manifold means.

3. The planter of claim 1 wherein a spring means is connected to said air valve means to normally hold said air valve means in an open position.

4. The planter of claim 1 wherein said air valve means are located on opposite sides of the juncture between said air fan means and said air conduit.

5. The planter of claim 2 wherein said air valve means includes control means to rotate said butterfly valve in said air manifold means.

6. The planter of claim 5 wherein said control means includes a solenoid.

7. The planter of claim 6 wherein said control means further comprises a switch operatively connected to a power source, said power source being connected to said solenoid.

8. The planter of claim 6 wherein said solenoid is connected to a shaft rotatably mounted in said manifold means, with said butterfly valve being secured to said shaft, said shaft connected to said air valve.

9. The planter of claim 8 further comprising a crank arm connected to said shaft and to said solenoid.

* * * * *